United States Patent
Devitt

[11] 3,871,495
[45] Mar. 18, 1975

[54] AUTOMATIC SLACK ADJUSTER FOR AIR BRAKES

[76] Inventor: Lloyd Raymond Devitt, 242 Oakdale Ave., Apt. 103, Saint Catharines, Ontario, Canada

[22] Filed: Oct. 24, 1973

[21] Appl. No.: 409,262

[52] U.S. Cl. .................. 188/79.5 K, 188/196 BA
[51] Int. Cl. ............................................. F16d 65/56
[58] Field of Search .......... 188/71.9, 79.5 K, 196 B, 188/196 BA

[56] References Cited
UNITED STATES PATENTS

| | | | |
|---|---|---|---|
| 2,109,637 | 3/1938 | Gutkaiss | 188/79.5 K X |
| 2,697,497 | 12/1954 | Shively | 188/196 BA |

Primary Examiner—Duane A. Reger

[57] ABSTRACT

The specification describes an improved slack adjuster for application especially to air brakes on trucks in which all adjusting mechanism is contained entirely within the slack adjuster body, the slack adjuster mechanism within the body comprising, a driven ring adapted to be driven by a splined actuator and rotatable within a body drive ring, the driven ring having drive and reverse ratchet means and pawl means within the body ring meshing with the ratchet means of the driven ring for transmission of torque from the body ring to the driven ring, a separate slack ring rotatable within the body ring through a predetermined angle and having an anchor arm extending exteriorly of the body for connection to a rigid anchorage; a further adjuster ring is freely rotatable about the actuator shaft within the slack ring through a predetermined angle; ratchet means on the adjuster ring mesh with the ratchet means of the driven ring; and a compression spring urges the ratchet means of the adjuster ring and the driven ring into meshing relationship.

4 Claims, 4 Drawing Figures

3,871,495

AUTOMATIC SLACK ADJUSTER FOR AIR BRAKES

This invention relates to a slack adjuster adapted for application to air brakes of trucks and like vehicles.

In my prior U.S. Pat. No. 3,690,418 the slack adjuster there disclosed while representing an improvement over the state of the art in functional aspects nevertheless retained certain characteristics of the State of the Art in requiring some of the internal mechanisms to be located within housings extending from the body casting of the slack adjustor and thus exposed to risk of physical damage and necessitating provision for substantial clearance about the slack adjuster relative to adjacent structure of the brake mechanism wheel axil and frame of the truck with which it must be associated when mounted.

It is the main object of this invention to provide an improved slack adjuster of compact form exhibiting only those protuberances necessary to effect attachment of same to a brake rod and to a stationary anchorage.

It is a further object of the invention to provide a slack adjuster of compact structure in which all of the adjusting mechanism is contained within a compact body housing of smooth contour. The objects of invention will be appreciated by a study of the following specification taken in conjunction with the accompanying drawings:

Figure 4:
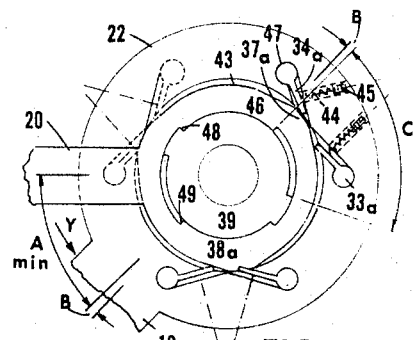
Figure 3:
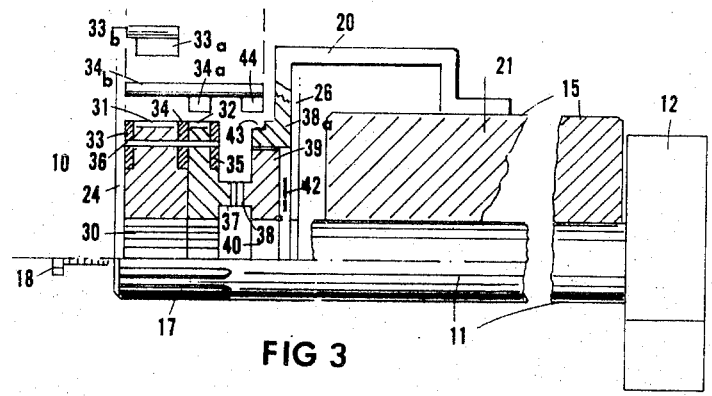
FIG. 3 is a partial sectional view of assembled structure of FIG. 2 relating to actuating shaft mounted in the manner indicated in FIG. 2.

FIG. 4 is a diagrammatic section of angular relations of components of the invention. Referring to the drawings, the slack adjuster 10 is mounted on a brake cam actuator shaft 11 carrying cam 12 actuating roller 13 adapted to move the brake shoe lining assemblies 14. Shaft 11 is rotatably mounted in brake spider housing 15 rigidly fastened to automobile frame structure 16 and as indicated in FIG. 3, embodies a splined end 17 extending beyond the spider 12 to mount the slack adjuster 10 by mounting bolt 18. The slack adjuster 11 is so located according to a zero brake position that a predetermined angle A is established between the actuator arm 19 of the slack adjuster and the anchorage arm 20 of same which remains stationary being fastened as by screw 21 to spider 15.

Figure 2:
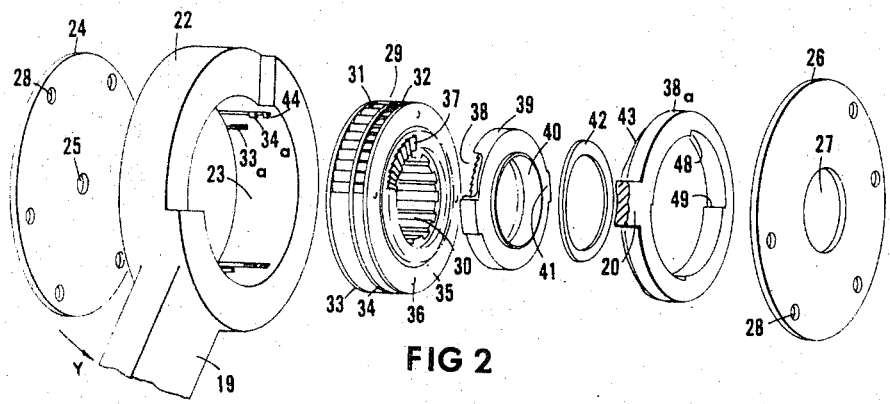
FIG. 2 is an exploded view of the structure of the slack adjuster of the invention showing the separate parts thereof.

As seen in FIG. 2 slack adjuster 10 comprises a forged body ring 22 from which extends the actuator arm 19, said body ring having a bore 23 of predetermined diameter and having an outer face or housing plate 24 with bolt hole 25 adapted to accommodate mounting bolt 18 and an inner cover plate 26 having a central hole 27 adapted freely to receive the am shaft 11, said cover plates having suitable holes 28 for the fastening thereof to body ring 22 by means of rivets or screws. A driven ring 29 has a splined bore 30 slidable on splines 17 of cam shaft 11 for direct torque transmission therebetween. Driven ring 29 embodies counterclockwise drive ratchet teeth 31 and clockwise return ratchet teeth 32 adapted to be engaged by pawl members 33 and 34 respectively, and carried by mounting rings 33, 34, 35 assembled therewith by means of rivet 36, said driven ring assembly also embodying lateral counterclockwise ratchet teeth 37 located within the mounting ring 35, the driven ring assembly closely fitting for free rotation within bore 23 of drive ring 22 but being restrained from relative rotation therebetween by both pawls 34 and 33 except at an angle of A minimum plus B wherein B is the ratchet tooth angle B so that at a position close to and approaching zero braking corresponding to a minimum value of A the return pawls 34 are raised by release bosses 37a of slack ring 38a forming a part of stationary anchorage arm 20. Ratchet teeth 38 of an adjuster ring 39 mesh with counterclockwise ratchet teeth 37 of drive ring 29 but adjuster ring has a free running bore 40 freely rotatable over cam shaft 11 and embodys limit lugs or stop lugs 41 limiting its rotation within the stationary slack ring through an angle C corresponding to angle C hereinafter referred to as the brake angle, i.e., the actuator ring 19 must move from zero brake position to full brake position to achieve the desired angle of rotation of cam 12.

A spring washer 42 fits slidably over mounting lip 42a of adjuster ring 39 and is engaged by cover plate 26 to maintain sufficient pressure for engagement of ratchet teeth 37,38 but permitting sufficient lateral motion of adjuster ring to enable the ratchet teeth 37,38 to slip in a disengaging direction to take up a new relative position between driven ring and adjuster ring corresponding to one ratchet tooth.

In operation counterclockwise actuation of actuator arm 19 in the direction of arrow Y causes pawls 33 engaging in ratchet teeth 31 to rotate the driven ring with the body drive ring 22 causing splines 30 to drive actuator cam shaft 11 through the full excursion of the braking angle C to apply the brake fully. Notice that in passing through the first few degrees of actuation by the actuating arm 19 the return pawls 34 will be moved free of release bosses 37a by proceeding over slack ring cam surface 43 so that throughout the braking angle except at substantially the zero position thereof the driven ring 29 is locked by the pawls 33,34 and ratchet teeth 31, 32 respectively against rotation in either direction relative to the drive ring. It will be noticed that pawls 34 have an outer cam arm 44 adapted to ride on cam surface 43 and that each of the pawls is biased by a suitable spring 44 retained by retaining screw 45 to bias the articulation of the pawl in the tangential slot 46 each of which terminates in a circular bore 47 adapted to accommodate the appropriate pawl shaft 33a, 34a. If brake wear is such that the actuator arm 19 may be moved through an angle greater than the braking angle C by an amount just greater than the ratchet tooth angle B then ratchet teeth 37 will slide over ratchet teeth 38 because lugs 41 of adjuster ring 39 will engage against abutment 48 in the slack ring 38a, the latter being stationary. The pawls 34 being engaged in the return ratchet teeth 32 on return or clockwise motion of the actuator ring 19 will transmit clockwise torque through splines 30 to cam shaft 11 but when separated by substantially and only the angle B from the zero brake position the pawls 34 will be released by slack ring cam bosses 37a whereby the actuator ring 22 and actuator ring 19 may be further rotated through the angle B to cause pawls 33 to drag over a ratchet tooth 31. The driven ring 29 being held stationary during this final adjustment by meshing ratchet teeth 37, 38 and the stop lugs 41 engaging in the stop abutment surfaces 49 of the slack ring 38a.

It will be apparent that only a sufficient number of drive and return ratchet teeth may be provided on the driven ring 29 to accomplish a sufficient range of adjustment to take up brake slack i.e., over an angle of say, 15° during brake life. However, it is preferred to have a sufficient number of pawls engaging ratchet teeth especially in the counterclockwise direction or direction of brake application as for example, three pawls as suggested in FIG. 4.

Figure 1:
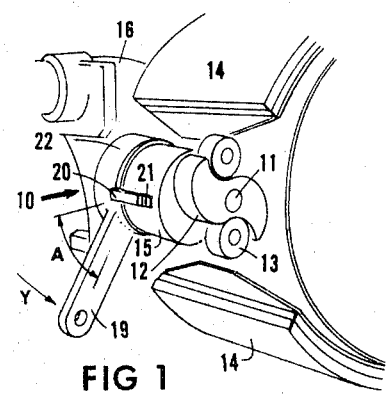
FIG. 1 is a perspective view of a compact slack adjuster of the invention installed on a brake arm shaft of a truck brake.

The fixed anchor arm 20 of the slack ring 38a proceeds exteriorly of the drive ring 22 through the gap provided by the quadrant recess 50 relative to the inner cover plate 26 and is conveniently located as indicated in FIGS. 1 and 3 for direct fastening to the brake spider 15.

While the slack adjuster of the invention has been described herein a manner providing for the take up of adjustment between the body drive ring and the driven ring at the end of the return stroke of the actuator arm 19, it will be understood that by positioning the cam bosses 37a to cause the return pawls 34a to be lifted at the end of the counterclockwise rotation of arm 19 corresponding to full brake application and through the predetermined brake angle C then brake lining wear will permit slippage of ratchets 37, 38 as before but on the beginning of the return stroke the return pawls being disengaged the drive pawls 31 will slip and take up a tooth. Further while discussion herein has referred to a take up of one tooth increment only it will be realized that the angular extent of cam bosses 37a may be designed to permit a take up of more than one tooth. In any event, an adjustment of more than one tooth may be accomplished by successive brake application for the amount of slack take up required.

What I claim as my invention is:

1. A slack adjuster mountable on the brake actuating spline shaft of an automotive brake of the brake issue type and comprising a slack adjuster housing in the form of a body ring having an actuator arm extending rigidly therefrom for connection to a brake rod, said body drive ring having a large central through bore extending between cover plates, one of said cover plates having a central bore adapted slidably to accommodate said actuator shaft therethrough; a driven ring within said body ring, said driven ring having a splined bore meshing with the spline of said actuator shaft and slidable therealong, said driven ring having drive and reverse ratchet means of similar predetermined ratchet step angle thereon; pawl means within said body ring meshing with the ratchet means of said driven ring for transmission of torque from said body ring to said driven ring; a slack ring rotatable within said body ring through a predetermined angle; an anchor arm extending from said slack ring exteriorly of said body ring for connection to a rigid anchorage; an adjuster ring freely rotatable about said actuator shaft and rotatable within said slack ring through a predetermined angle; ratchet means on said adjuster ring meshing with the ratchet means of said driven ring; and a compression spring urging the ratchet means of said adjuster ring and said driven ring into meshing relationship.

2. The slack adjuster of claim 1 and means for releasing said reverse body ring ratchet means from a zero brake angle through an angle greater than said ratchet step angle.

3. The slack adjuster of claim 1 in which the angle of free rotation of said adjuster ring within said slack ring is equal to a predetermined brake angle for the actuator arm of the body ring.

4. The slack adjuster of claim 1 and means for releasing said reverse body ring ratchet means beyond maximum predetermined brake angle.

* * * * *